United States Patent
He et al.

(10) Patent No.: US 12,443,365 B2
(45) Date of Patent: Oct. 14, 2025

(54) OUT-OF-BAND SUPPORT FOR SOFTWARE REDUNDANT ARRAY OF INDEPENDENT DISKS

(71) Applicant: DELL PRODUCTS L.P., Round Rock, TX (US)

(72) Inventors: Ramesha He, Banagalore (IN); Ajay Shenoy, Bangalore (IN); Bharath Koushik, Bangalore (IN); Nikita Joshi, Hubli (IN); Venkataragavan Vijayakumar, Bangalore (IN); Manjunath Vishwanath, Bangalore (IN); Devadath Vijay, Kozhikode (IN); Harish Babu, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 36 days.

(21) Appl. No.: 18/361,852

(22) Filed: Jul. 30, 2023

(65) Prior Publication Data
US 2025/0036313 A1   Jan. 30, 2025

(51) Int. Cl.
G06F 12/00     (2006.01)
G06F 3/06      (2006.01)

(52) U.S. Cl.
CPC ......... *G06F 3/0658* (2013.01); *G06F 3/0607* (2013.01); *G06F 3/0689* (2013.01)

(58) Field of Classification Search
CPC .... G06F 3/0658; G06F 3/0607; G06F 3/0689; G06F 3/0662; G06F 3/0605
See application file for complete search history.

(56) References Cited

U.S. PATENT DOCUMENTS

| 9,146,812 | B2 | 9/2015 | Zhang et al. |
| 11,573,805 | B2 | 2/2023 | Li et al. |
| 2019/0082008 | A1* | 3/2019 | Gupta ................. H04L 41/5022 |
| 2021/0089587 | A1* | 3/2021 | Gupta ............... G06F 16/90332 |
| 2021/0389955 | A1* | 12/2021 | Li ....................... H04L 41/0213 |
| 2022/0121619 | A1 | 4/2022 | Sharma et al. |

* cited by examiner

Primary Examiner — Shawn X Gu
(74) Attorney, Agent, or Firm — Larson Newman, LLP

(57) ABSTRACT

An information handling system provides configuration, monitoring, and inventory services between an application programming interface service hosted by the information handling system and a remote client. The system communicates using application program interfaces exposed by the application programming interface service with a device associated with the information handling system, and packages data received from the device via the application programming interface service before transmitting the data to the remote client.

20 Claims, 6 Drawing Sheets

OUT-OF-BAND SUPPORT FOR SOFTWARE REDUNDANT ARRAY OF INDEPENDENT DISKS

FIELD OF THE DISCLOSURE

The present disclosure generally relates to information handling systems, and more particularly relates to out-of-band support for software redundant array of independent disks.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system provides configuration, monitoring, and inventory services between an application programming interface service hosted by the information handling system and a remote client. The system communicates using application program interfaces exposed by the application programming interface service with a device associated with the information handling system, and packages data received from the device via the application programming interface service before transmitting the data to the remote client.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
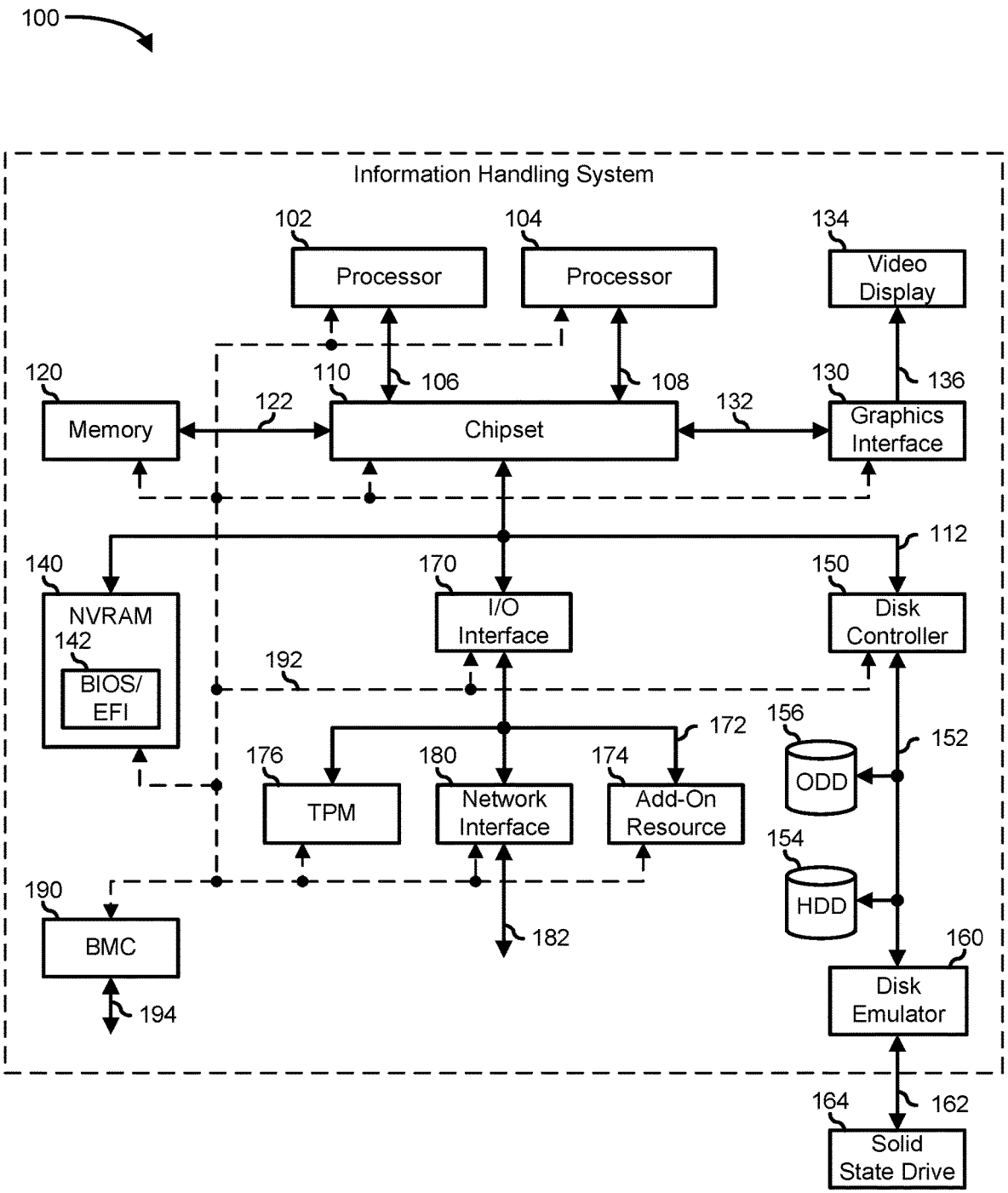
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Certain management and control capabilities, such as via an embedded software redundant array of independent disks (RAID) controller, are typically managed using in-band solutions, such as by running the software RAID solution at a host operating system. For large or critical networks, in-band management may not be enough. Providing an out-of-band ability to administer traditionally in-band management functionality, such as software RAID, provides a user with a secure and dedicated alternative that allows the user remote management and control of software RAID devices.

Figure 2:
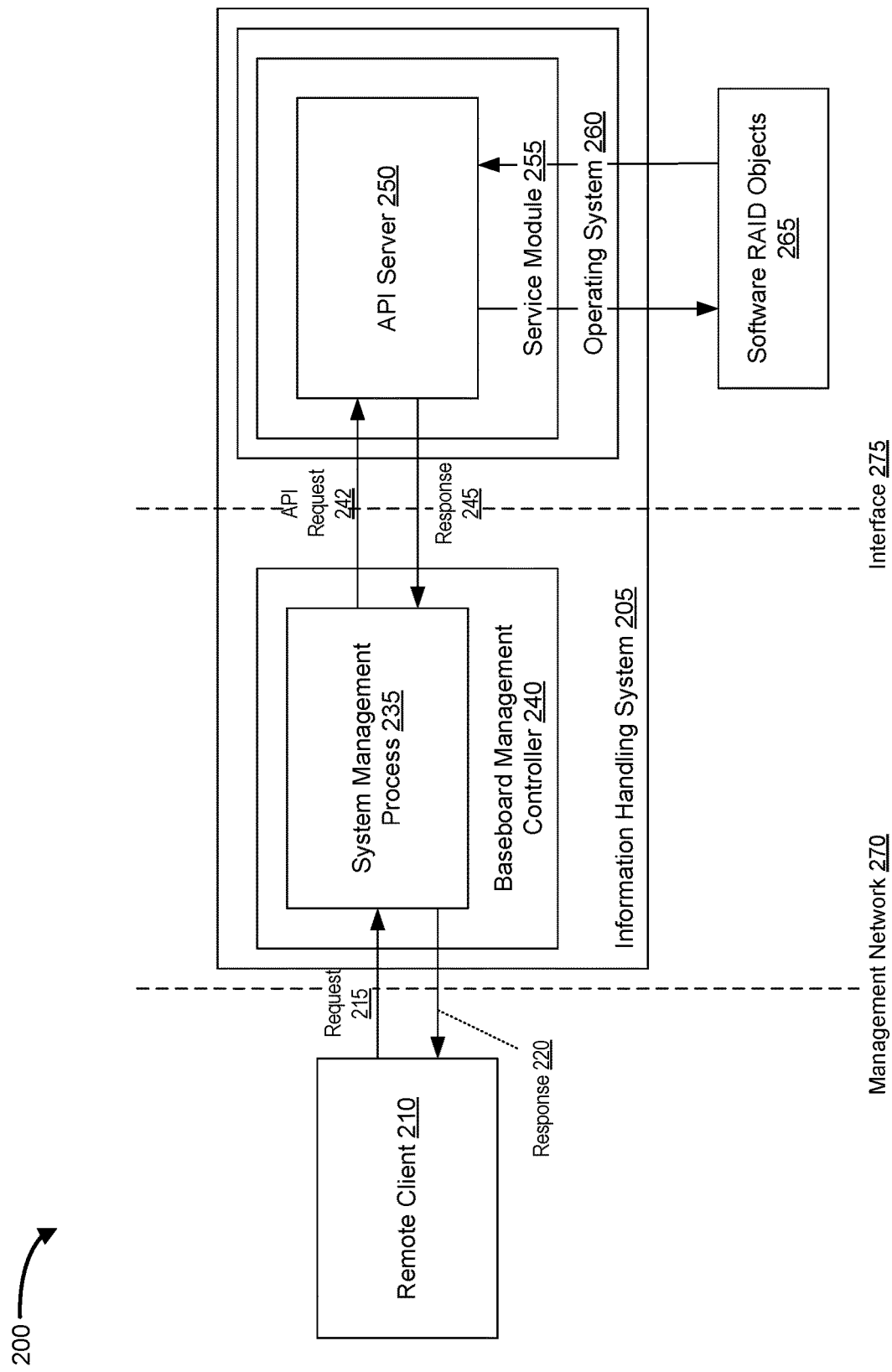
FIG. 2 is a block diagram illustrating an environment for out-of-band support for a software redundant array of independent disks (RAID), according to an embodiment of the present disclosure.

FIG. 2 shows an environment 200 for out-of-band support for a software RAID feature of a management controller. Environment 200 includes a remote client 210, an information handling system 205, and software RAID objects 265. Information handling system 205, which is similar to information handling system 100 of FIG. 1, includes a BMC 240, an operating system 260, and a software RAID object 265. Remote client 210 may be in another information handling system that is located remotely from information handling system 205. Remote client 210 is communicatively coupled with BMC 240 via a management network 270. Further, remote client 210 may be configured to access one or more resources or functions of system management process 235. BMC 240 is communicatively coupled to API server 250 via interface 275. BMC 240 is similar to BMC 190 of FIG. 1 and includes a system management process 235.

Operating system 260 hosts a service module 255 which further hosts or runs API server 250. Management network 270 may be configured separately from other network interfaces of information handling system 205, such as interface 275. Further, management network 270 may be configured to provide an out-of-band network interface that allows an information technology specialist to perform maintenance functions from a remote location, such as remote client 210 of an information handling system. For example, a user may set up one or more RAID arrays. Management network 270 may be configured separately from interface 275 which may be USB or network interface controller interface.

BMC 240 may be configured to provide enumeration, configuration, monitoring, and inventory services of RAID devices using remote client 210 via an API service, such as API server 250. The API service may be hosted by operating system 260 of information handling system 205. In one embodiment, BMC 240 may be configured to manage information handling systems and their RAID devices. The RAID devices may include storage devices, network controllers, storage controllers, processors, memory resources, and various other hardware or virtual devices. The hardware devices may be accessed via an in-band and/or an out-of-band management connection.

For example, software RAID inventory, configuration, and monitoring may be provided to remote client 210 via system management process 235 which is hosted by BMC 240. System management process 235 may be configured to perform out-of-band systems management via APIs running on API server 250. For example, system management process 235 may be configured to manage workstations, servers, storage devices, etc. Examples of system management process 235 include a RedfishR process, an IPMI process, or similar. In one embodiment, system management process 235 may expose the management functions using a representational state transfer (REST) architecture that defines a set of constraints and properties based on a hypertext transfer protocol (HTTP) and enables RESTful web services. As such, APIs exposed by API server 250 may be REST APIs. Thus, BMC 240 and/or system management process 235 may communicate with remote client 210 and software RAID objects 265 using application program interfaces exposed by an API service, such as API server 250. Accordingly, the user may perform various management and control functions of RAID devices using remote client 210

In particular, remote client 210 may communicate with BMC 240 via system management process 235. BMC 240 may communicate to operating system 260 using APIs exposed by service module 255. Then, the APIs may be used to enumerate, query, retrieve, and configure software RAID objects 265. Software RAID objects 265 include an inventory of storage controllers, physical storage device inventory, virtual storage device inventory, etc. An example of service module 255 may include iDRAC service Module® (iSM). Service module 255 may be configured to expose APIs for a sub-system of environment 200, such as BMC 240, edge orchestrators, or similar. Data, such as software RAID objects 265, returned by service module 255 may be packaged according to a schema of system management process 235 and transmitted to remote client 210. For example, BMC 240 or system management process 235 may be configured to package the data received from API server 250. In particular, the data may be packaged according to a Redfish schema before transmitting to remote client 210. The packaged data may be returned to remote client 210 via one or more interfaces, such as those shown in FIG. 3. A GUI may also be associated with system management process 235 and be used to render the data graphically for a user.

In one embodiment, system management process 235 may be configured to act as a REST API client and forward requests, such as an API request 242, to API server 250. System management process 235 may also be configured to process responses, such as a response 245, from API request 242 and package them as compliant responses for remote client 210. For example, system management process 235 may be configured to process an API request to enable an enumeration of RAID controllers through out-of-band interfaces. The enumeration may identify supported devices of the RAID controllers that are attached to the system. The enumeration may also list information about the RAID controllers, physical disks, and virtual disks.

In one particular example, an information technology specialist may request an inventory of RAID controllers using remote client 210. Remote client 210 may transmit a request 215 to system management process 235. System management process 235 may in turn forward request 215 as API request 242 to API server 250 which then may query software RAID objects 265 for the inventory of RAID controllers. API server 250 may submit response 245 with one or more software RAID inventory objects and associated information to system management process 235. System management process 235 may process or package response 245 to be a RedfishR compliant response, such as a response 220, wherein response 220 may include the inventory of the RAID controllers. The inventory and associated information may be displayed via a GUI on remote client 210 for the information technology specialist.

Figure 3:
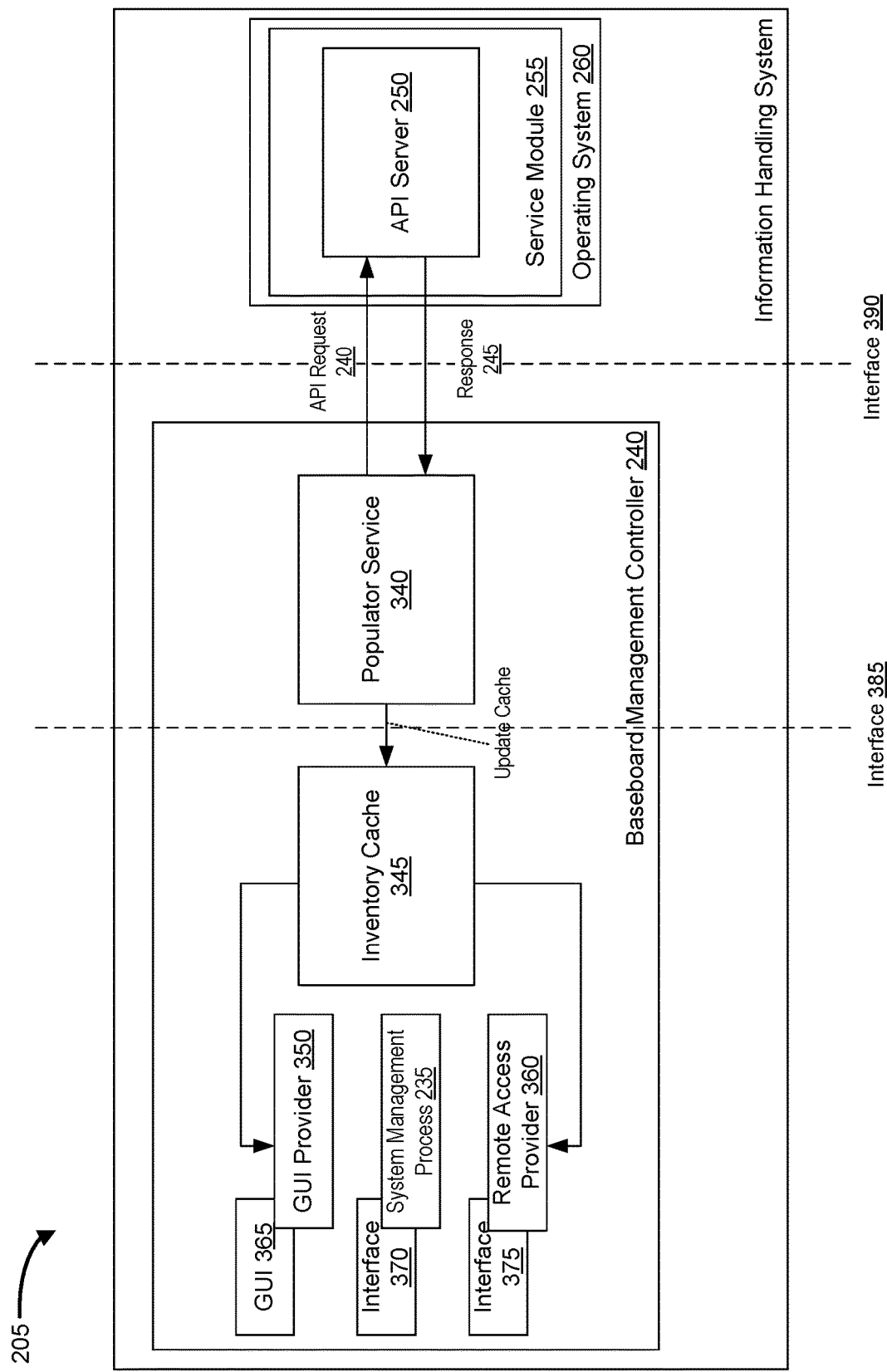
FIG. 3 is a block diagram illustrating an information handling system of the environment in FIG. 2 in greater detail, according to an embodiment of the present disclosure.

FIG. 3 shows information handling system 205 in greater detail. Information handling system 205 includes BMC 240 and operating system 260. BMC 240 includes a GUI 365, a GUI provider 350, an interface 370, system management process 235, an interface 375, a remote access provider 360, a software RAID inventory cache 345, and a populator service 340. Operating system 260 includes service module 255 which hosts API server 250. Populator service 340 may be communicatively coupled to GUI provider 350, system management process 235, and remote access provider 360 via an interface 385. Interface 385 may be a desktop bus interface or a similar inter-process communication mechanism.

Populator service 340, which may be a desktop bus-based service, can be communicatively coupled to operating system 260, service module 255, and/or API server 250 via an interface 390. Populator service 340 may be configured to pool information associated with software RAID devices, such as performing an inventory of the devices. Interface 390 may be a USB or a network interface controller. The components of information handling system 205 may be implemented in hardware, software, firmware, or any combination thereof. The components shown are not drawn to scale and information handling system 205 may include additional or fewer components. In addition, connections between components may be omitted for descriptive clarity.

BMC 240 may be configured to perform out-of-band system management functions, such as software RAID control of a software RAID inventory cache 345. The out-of-band system management function can be performed via an interface of one or more providers, such as remote access provider 360, a system management process 235, and a GUI provider 350. The interfaces may allow a user to view information associated with software RAID objects, software RAID inventory cache 345, or similar. The interfaces may also be used by the user to manage various configurations associated with software RAID objects, and software RAID inventory cache 345.

Remote access provider 360 may be adapted to provide remote and/or local management of the information handling systems and their hardware components. Commands associated with remote access provider 360 can be run via a remote access interface, such as interface 375. The commands can be run remotely from a remote client or management station. The commands can also be run locally on the managed information handling system. An example of remote access provider 360 may be a RACADM, WSMan, or similar. GUI provider 350 may be configured to provide a set of GUI elements to GUI 365. API server 250 may be configured as a central management entity that receives API requests from baseboard management controller 240 and/or populator service 340.

In various embodiments, information handling system 205 may not include each of the components shown in FIG. 2 and FIG. 3. Additionally, or alternatively, information handling system 205 may include various additional components in addition to those that are shown in FIG. 2 and FIG. 3. Furthermore, some components that are represented as separate components in FIG. 2 and FIG. 3 may in certain embodiments instead are integrated with other components. For example, in certain embodiments, all or a portion of the functionality provided by the illustrated components may instead be provided by components integrated into one or more processor(s) as a system-on-a-chip.

Those of ordinary skill in the art will appreciate the configuration, hardware, and/or software components of environment 200 depicted in FIG. 2, and information handling system 205 depicted in FIG. 3 may vary. For example, the illustrative components within information handling system 205 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 4:
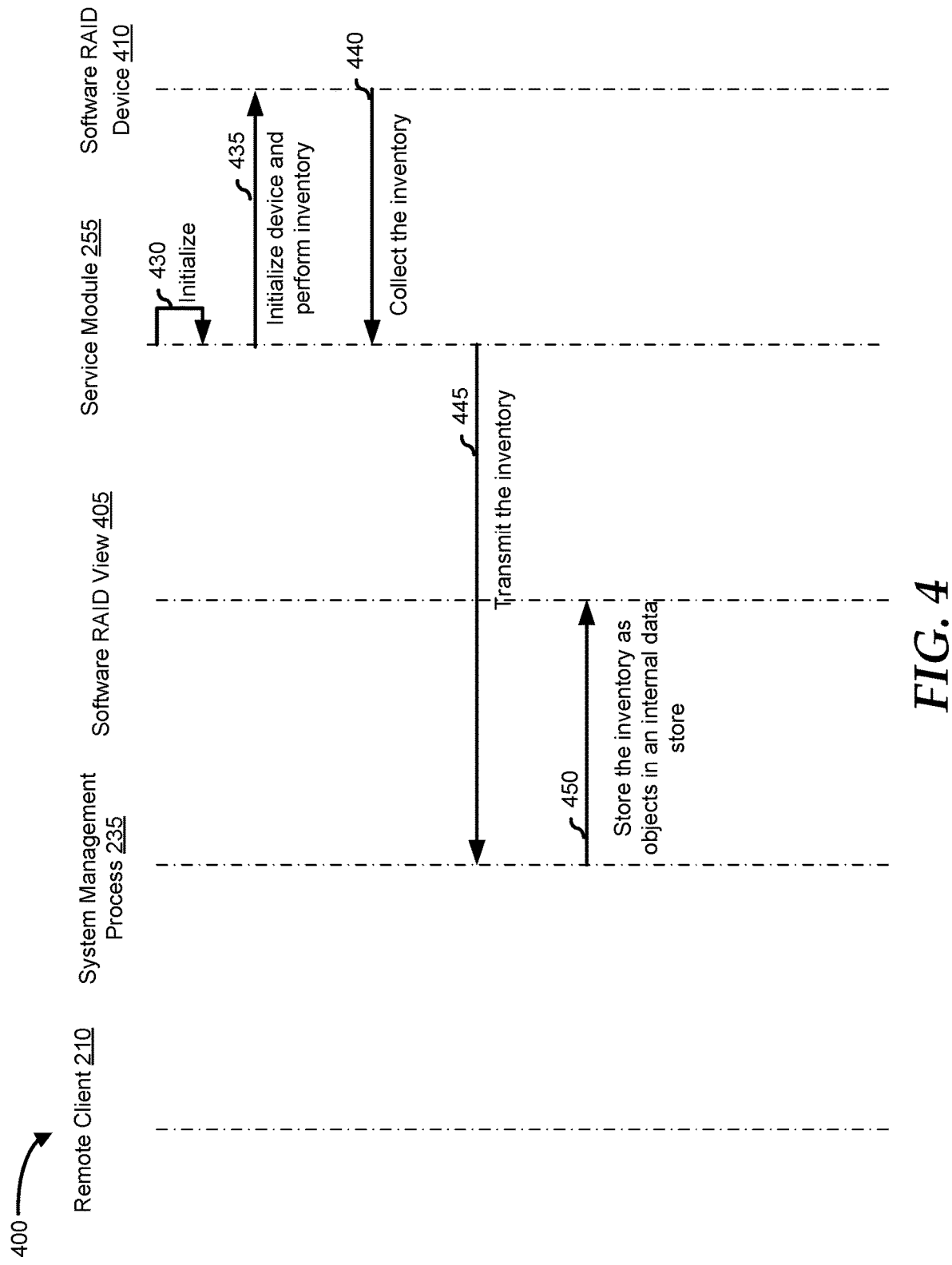
FIG. 4 is a diagram illustrating a swim-lane for discovery and inventory of software RAID devices, according to an embodiment of the present disclosure.

FIG. 4 shows a swim-lane 400 for the enumeration, discovery, and inventory of software RAID devices. Swim-lane 400 may be performed by one or more components of environment 200 of FIG. 2 and/or information handling system 205 of FIG. 3. For example, swim-lane 400 includes remote client 210, system management process 235, a software RAID view 405, service module 255, and a software RAID device 410. In one example, software RAID view 405 may be an application or software program hosted by BMC 240 that manages storage of the software RAID inventory, software RAID objects, or similar. Software RAID view 405 may also provide an interface for system management process 235 to query, update, and/or receive information associated with the software RAID inventory, software RAID objects, or similar. In one example, software RAID view 405 may be similar to populator service 340 of FIG. 3. However, while embodiments of the present disclosure are described in terms of environment 200 of FIG. 2 and/or information handling system 205 or FIG. 3, it should be recognized that other systems may be utilized to perform the described blocks. One of skill in the art will appreciate that this swim-lane explains a typical example, which can be extended to advanced applications or services in practice.

Swim-lane 400 typically starts at 430, wherein service module 255 on a host information handling system may be initialized. At 435, service module 255 may initialize software RAID device 410 and perform an inventory of software RAID devices and their components, wherein the software RAID devices are associated with the host information handling system. In one embodiment, software RAID device 410 may be a computer storage system that can spread or replicate data across multiple drives. In another embodiment, software RAID device 410 may be a specialized server such as a RAID information handling system, which may be configured in different types of RAID implementations. Software RAID device 410 may also include controllers, physical disks, and virtual disks which are attached to the RAID information handling system.

At 440, service module 255 may collect an inventory of various software RAID devices, such as software RAID device 410. At 445, service module 255 may push or transmit the inventory and/or associated information to system management process 235. The inventory transmitted may be in an inventory cache similar to inventory cache 345 of FIG. 3. At 450, system management process 235 may store the inventory as software RAID objects that are similar to software RAID objects 265, in an internal data store. For example, the software RAID objects may be stored in a software RAID configuration database and rendered at remote client 210 via an interface, such as GUI 365 and interfaces 370 and 375. Thus, the enumeration, discovery, and inventory of the software RAID devices may be performed through coordination between system management process 235, software RAID view 405, software module 255, and software RAID device 410.

Figure 5:
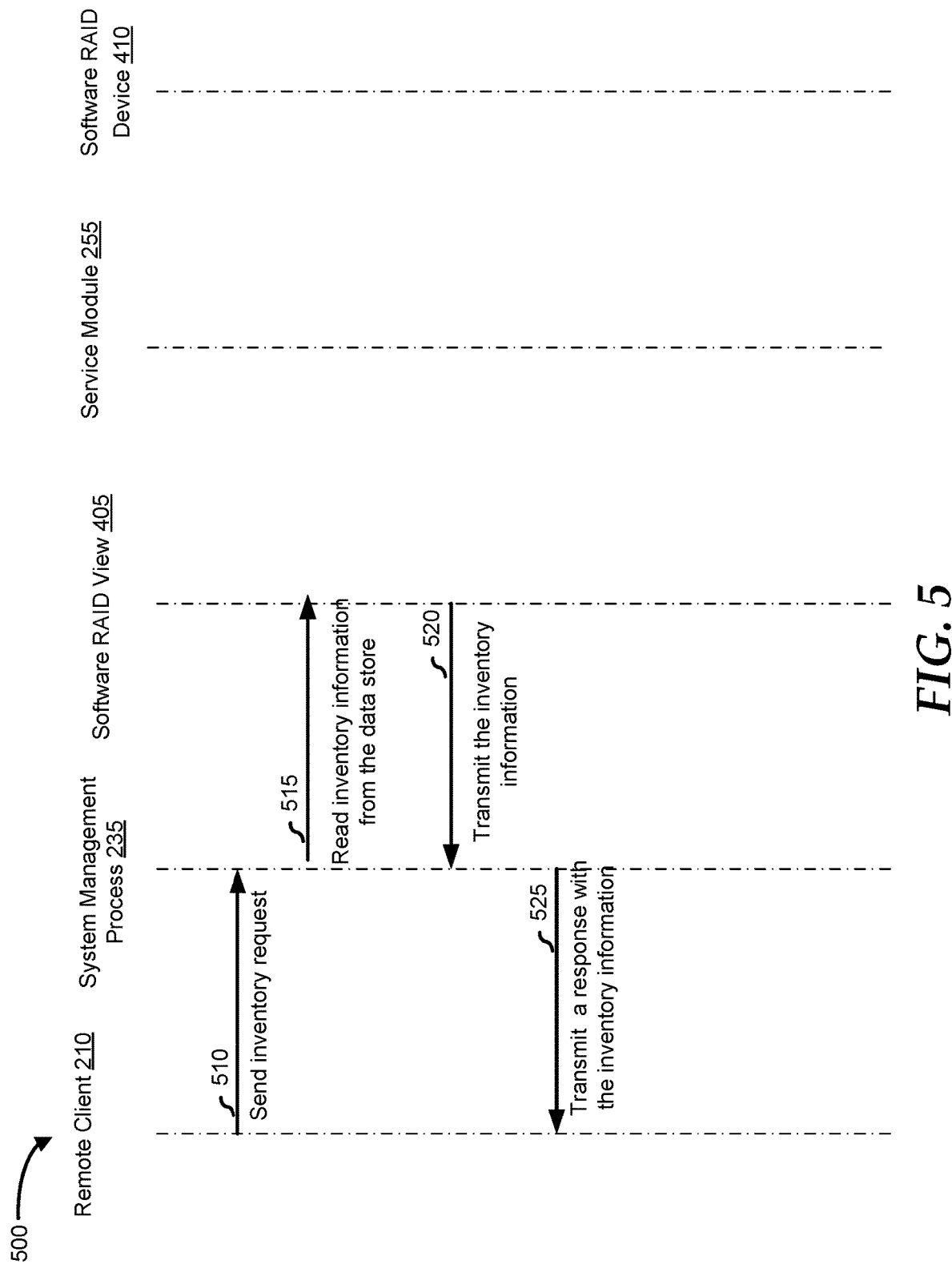
FIG. 5 is a diagram illustrating a swim-lane for an inventory collection process from a remote client, according to an embodiment of the present disclosure.

FIG. 5 shows a swim-lane 500 for an inventory collection process from a remote client. RAID information handling systems are generally configured in different types of RAID implementations that are each enabled with a variety of hardware and software component configurations. One or more blocks in swim-lane 500 may be performed by components, such as depicted in swim-lane 400 of FIG. 4. Similarly, one of skill in the art will appreciate that this swim-lane explains a typical example, which can be extended to advanced applications or services in practice.

Swim-lane 500 typically starts at 510 wherein a user at remote client 210 may send an inventory request to system management process 235. At 515, system management process 235 may accept the inventory request and then may query or read inventory information from the data store where the inventory was stored as software RAID objects at 450 of FIG. 4. System management process 235 may read the inventory information via software RAID view 405 which may be installed on BMC 240 of FIG. 2. At 520, software RAID view 405 may transmit the inventory information to system management process 235 in response to the inventory request. At 525, system management process 235 may then transmit a response with the inventory information to remote client 210. Thus, inventory requests of software RAID devices may be performed through coordination between remote client 210, system management process 235, and software RAID view 405.

Figure 6:
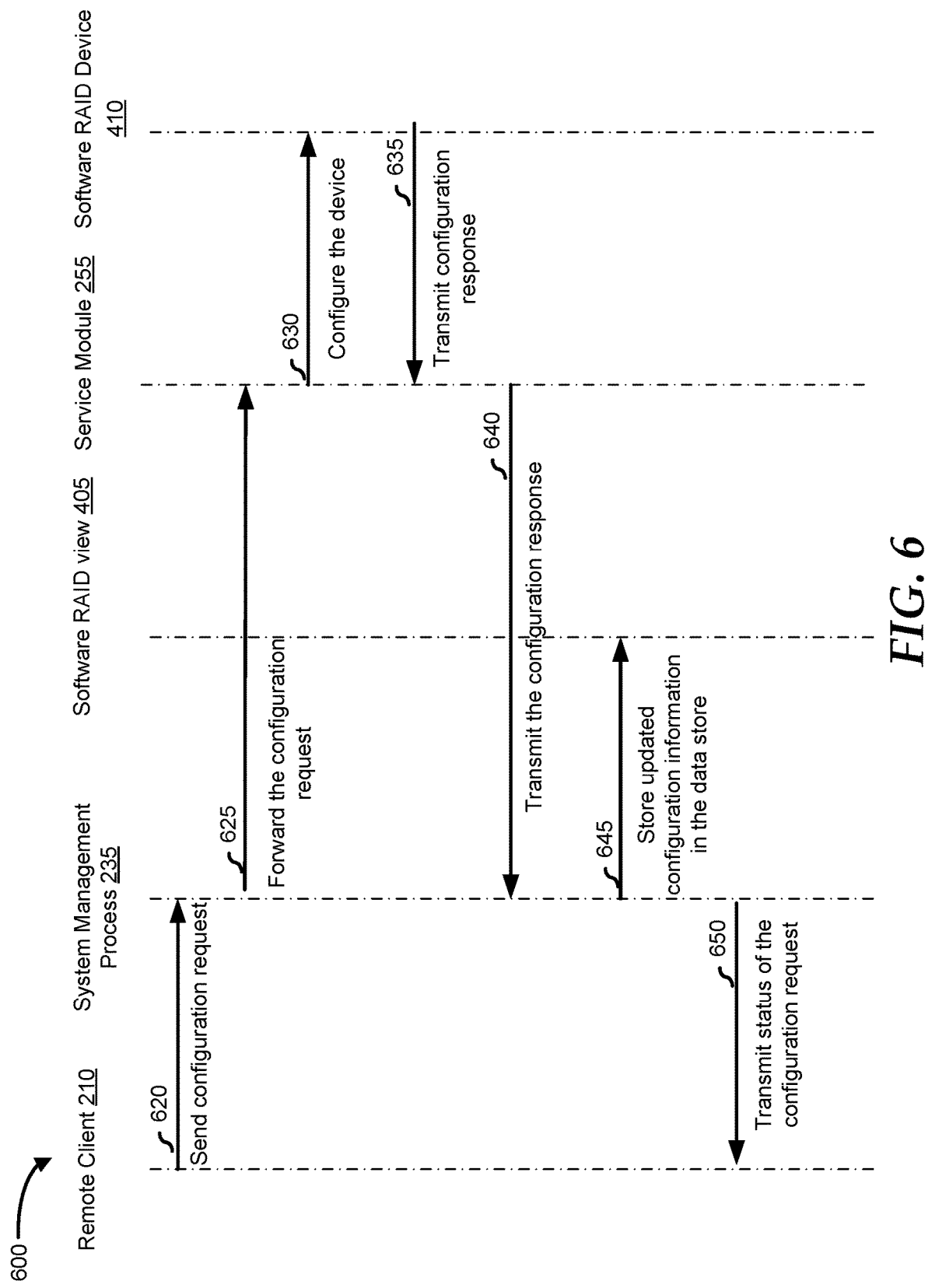
FIG. 6 is a diagram illustrating a swim-lane for a configuration process of a software RAID device from a remote client, according to an embodiment of the present disclosure.

FIG. 6 shows a swim-lane 600 for a software RAID configuration process from a remote client. One or more blocks in swim-lane 600 may be performed by components depicted in swim-lane 400 of FIG. 4. Similarly, one of skill in the art will appreciate that this swim-lane explains a typical example, which can be extended to advanced applications or services in practice.

Swim-lane 600 typically starts at 620, wherein remote client 210 may send a configuration request 620 to system management process 235. For example, a user may request a RAID configuration through a user interface at remote client 210. At 625, system management process 235 upon receiving the request may forward the configuration request to service module 255. At 630, service module 255 may configure software RAID device 410 based on the configuration request. For example, configuration commands and utilities may be dispatched from service module 255 to software RAID device 410 to configure it. At 635, software RAID device 410 may transmit a configuration response to service module 255. The configuration response includes status information of the configuration request. At 640, service module 255 may transmit the configuration response to system management process 235. At 645, system management process 235 may store the received updated configuration information in the data store. At 650, system management process 235 may transmit the status information of the configuration request to the remote client. Thus, management of software RAID device configurations may be performed through coordination between remote client 210, system management process 235, software RAID view 405, software module 255, and software RAID device 410.

Although FIG. 4, FIG. 5, and FIG. 6 show example blocks of swim-lanes 400, 500, and 600. In some implementations, swim-lanes 400, 500, and 600 may include additional blocks, fewer blocks, different blocks, or differently arranged blocks than those depicted in FIG. 4, FIG. 5, and FIG. 6. Those skilled in the art will understand that the principles presented herein may be implemented in any suitably arranged processing system. Additionally, or alternatively, two or more of the blocks of swim-lanes 400, 500, and 600 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
a processor; and
a management controller configured to:
communicate using an out-of-band network interface with a remote client;
provide an out-of-band maintenance function of a redundant array of independent disks (RAID) device to the remote client through an application programming interface service hosted by the information handling system;
communicate using application program interfaces exposed by the application programming interface service with the RAID device; and
package data received from the RAID device via the application programming interface service according to a schema associated with the management controller before transmitting the data to the remote client using the out-of-band network interface.

2. The information handling system of claim 1, wherein the application program interfaces are representational state transfer application programming interfaces.

3. The information handling system of claim 1, wherein the application program interfaces are used to retrieve and configure software RAID objects.

4. The information handling system of claim 1, wherein the device is a software RAID device.

5. The information handling system of claim 1, wherein the data is packaged in a system management process.

6. The information handling system of claim 1, wherein a service module is hosting the application programming interface service.

7. The information handling system of claim 1, wherein a service module is hosted by an operating system of the information handling system.

8. The information handling system of claim 1, wherein software RAID objects are rendered via a graphical user interface of the remote client.

9. A method comprising:
communicating using an out-of-band network interface with a remote client;
providing an out-of-band maintenance function of a redundant array of independent disks (RAID) device to the remote client through an application programming interface service;
communicating using application program interfaces exposed by the application programming interface service with the RAID device; and
packaging data received from the RAID device via the application programming interface service according to a schema associated with a management controller before transmitting the data to the remote client using the out-of-band network interface.

10. The method of claim 9, wherein the application program interfaces are representational state transfer application programming interfaces.

11. The method of claim 9, wherein the application program interfaces are used to configure software RAID devices.

12. The method of claim 9, wherein the data is packaged in a system management process.

13. The method of claim 9, wherein a service module is hosting the application programming interface service.

14. The method of claim 9, wherein a service module is hosted by an operating system.

15. The method of claim 9, wherein software RAID objects are rendered via a graphical user interface of the remote client.

16. A non-transitory computer-readable medium to store instructions that are executable to perform operations comprising:
communicating using an out-of-band network interface with a remote client:
providing an out-of-band maintenance function of a redundant array of independent disks (RAID) device to the remote client through an application programming interface service;
communicating with a device using application program interfaces exposed by the application programming interface service with the RAID device; and
packaging data received from the RAID device via the application programming interface service according to a schema associated with a management controller before transmitting to the remote client using the out-of-band network interface.

17. The non-transitory computer-readable medium of claim 16, wherein the application program interfaces are representational state transfer application programming interfaces.

18. The non-transitory computer-readable medium of claim 16, wherein the data is packaged in a system management process before the data is returned to the remote client.

19. The non-transitory computer-readable medium of claim 16, wherein a service module is running the application programming interface service.

20. The non-transitory computer-readable medium of claim 16, wherein a service module is hosted by an operating system.

* * * * *